Patented June 17, 1941

2,246,082

UNITED STATES PATENT OFFICE 2,246,082

PREPARATION OF ALKYL HALIDES

William E. Vaughan and Frederick F. Rust, Berkeley, Calif., assignors to Shell Development Company, San Francisco, Calif., a corporation of Delaware No Drawing. Application August 22, 1939, Serial No. 291,365

15 Claims. (Cl. 260—662)

The object of this invention is a process for effecting the efficient halogenation of hydrocarbon mixtures consisting of saturated aliphatic hydrocarbons and ethylene to produce high yields of saturated halides, and particularly saturated monohalides, of the hydrocarbons treated.

Although the invention is particularly applicable to the halogenation of hydrocarbon mixtures consisting of ethane and ethylene to produce ethyl halides, it is to be understood that other hydrocarbon mixtures of saturated aliphatic hydrocarbons with ethylene may also be employed for the production of the corresponding saturated organic halides.

The halides of saturated aliphatic hydrocarbons find numerous uses both as intermediates and as final products. Thus, ethyl chloride and ethyl bromide are employed for the preparation of tetraethyl lead. Ethyl chloride is also the primary material for making ethyl cellulose, as well as of ethyl mercaptan which in itself is an intermediate in the preparation of sulfonal, a known soporific. Furthermore, ethyl chloride is used as a refrigerant and as a local freezing anesthetic for minor operations. The other saturated aliphatic halides are also highly useful and valuable products.

It is known that saturated aliphatic hydrocarbons may be reacted with a halogen, such as chlorine or bromine, to form the corresponding saturated aliphatic monohalide. In such a reaction, a halogen atom is substituted for a hydrogen atom of the hydrocarbon molecule, the liberated hydrogen atom reacting with the remaining negatively charged halogen atom to form a molecule of hydrogen halide. Therefore, such halogenations via substitution form a halide of the saturated aliphatic hydrocarbon, and a hydrogen halide.

Usually the halo-substitution reactions require relatively high temperatures particularly when these reactions are not promoted by catalysts and/or light. This is particularly true of the chloro-substitution of ethane. For example, U. S. Patent 1,242,208 suggests that ethyl chloride may be formed by passing a gaseous mixture comprising chlorine and an excess of ethane through a reaction chamber maintained at between about 300° and 500° C. Also, British Patent 338,742 teaches that ethane and chlorine or bromine may be interacted to form the corresponding ethyl monohalide by effecting the reaction in the vapor phase at temperatures of between about 360° and 380° C., and without the use of light. Similarly, thermal halo-substitutions of higher homologues of the methane series also require relatively high temperatures, these temperatures being above about 150° C., and usually above about 250° C., but preferably below the temperature of dissociation of the reactant and/or of the product of reaction. Thus, in the case of propane, the efficient vapor-phase chlor-substitution requires the use of temperatures as high as 700° C.

As to unsaturated organic compounds, the olefinic hydrocarbons of primary character, e. g. ethylene, and those of secondary character, i. e. those which contain an olefinic linkage between two non-tertiary carbon atoms of aliphatic character, at least one of which is of secondary character, may be reacted with a halogen to produce either products of halogen addition or products of halo-substitution, depending primarily upon the reaction temperature employed. At relatively low temperatures, when the reaction is not catalyzed by light or a catalyst, the reaction between such unsaturated organic compounds and a halogen, such as chlorine, primarily effects the formation of halogen addition products. On the other hand, at relatively higher temperatures, such as those above about 200° C., the dominating reaction is one of halo-substitution. This is disclosed and claimed by U. S. Patents Nos. 2,130,084 and 2,167,927. Thus, the former teaches that unsaturated organic compounds of secondary character, such as the secondary olefins, may be halo-substituted to valuable allyl type halides by subjecting them to the action of the halogen at temperatures above about 200° C. but below the decomposition temperature of the reacting unsaturate and/or of its product of halo-substitution. The optimum temperature for the chlor-substitution of propylene to form allyl chloride is between 350° C. and about 700° C. As to the halo-substitution of ethylene, U. S. Patent No. 2,167,927 discloses and claims that efficient halo-substitution of this unsaturate may be effected at temperatures of about 200° to 700° C. The preferred temperature for chlor-substitution is in the neighborhood of 400° C. at which temperature the conversion of ethylene to vinyl chloride is practically quantitative, the reaction product being substantially free of either dichlorethane or trichlorethane. In other words, when the halogenation is effected at said preferred temperature, there is substantially no halogen addition.

From the above it is seen that the thermal halogenation of the saturated organic compounds, such as ethane and its homologues, and the efficient and substantially quantitative thermal halo-substitution of unsaturated organic compounds of primary and secondary character, fall substantially within the same operating temperature. In fact, the thermal reaction between a halogen, such as chlorine or bromine, and a hydrocarbon mixture consisting, for example, of propane and propylene, when effected within the above-mentioned temperature range of above about 200° C. and preferably between about 350° C. and 700° C., results in the production of a reaction product consisting of a mixture of halogenated hydrocarbons including propyl halide, allyl halide, as well as products resulting from the interaction of the hydrocarbon reactants and/or of the mentioned reaction products with the hydrogen halide formed as a by-product of the halo-substitution reaction. It would, therefore, be expected that the reaction between a halogen and a hydrocarbon mixture consisting of ethane and ethylene, or of ethylene and saturated aliphatic hydrocarbons higher than ethane, when effected within the mentioned high temperature range (e. g. 300° C. to 500° C. or above) would produce a mixture of saturated and unsaturated halides including vinyl halide and the alkyl halide.

It has been discovered, however, contrary to the above expectations, that hydrocarbon mixtures consisting of or predominating in ethylene and one or more saturated organic compounds, such as saturated aliphatic hydrocarbons, may be halogenated to produce the halide or halides of such saturated organic compounds to the substantial exclusion of other halogenated products. It has been further discovered that hydrocarbon mixtures consisting of ethylene and saturated aliphatic hydrocarbons, such as ethane, propane, butane, or mixtures thereof, may be effectively halogenated to produce the halide or halides of the saturated aliphatic hydrocarbons to the substantial exclusion of products of halo-substitution and/or halo-addition of ethylene, such halogenation of the mixtures not requiring any preliminary separation of the ethylene from the hydrocarbon mixture to be thermally halogenated. It has also been discovered that high yields of ethyl halide may be obtained by vapor phase halogenation of ethane-ethylene mixtures at relatively high temperatures above about 225° C., and preferably above about 275° C., such high temperature halogenation of the ethane-ethylene mixtures producing the corresponding ethyl halide by the interaction of halogen with the ethane, while the ethylene remains substantially unattacked. At lower temperatures the ethylene is halogenated by addition of hydrogen halide to produce ethyl halide.

The above discovery that ethane and/or its higher homologues when admixed with ethylene may be halogenated at high temperatures to produce the halide or halides of the saturated aliphatic hydrocarbons to the substantial exclusion of products of halo-addition and/or halo-substitution of the ethylene, was quite unexpected. In the first place, ethane or its homologues, in mixtures thereof with ethylene, when brought in contact with a halogen, such as chlorine, at relatively low temperatures and in the absence of light, will remain unaffected or substantially unattacked, and will merely act as a diluent, while the ethylene reacts with the halogen via addition. Thus, ethane does not react with chlorine when these substances are brought together at about 25° C., in the absence of light. On the other hand, a 1:1 molal ratio of chlorine and ethylene, under the same conditions will effect the reaction of more than 75% of the chlorine. Even at a temperature of about 150° C., while using calcium chloride as a catalyst, there is only a very small conversion of ethane to ethyl chloride, although ethylene and chlorine react substantially quantitatively.

It has also been discovered that only mixtures of ethylene with saturated aliphatic hydrocarbons, such as ethane, propane, etc., may be treated according to the process of this invention to produce relatively high yields of alkyl halides to the substantial exclusion of products of halo-substitution of ethylene. Thus, hydrocarbon mixtures containing the mentioned saturated aliphatic hydrocarbons and unsaturated organic compounds of secondary character when reacted with a halogen at the relatively high temperatures, produce complex mixtures of saturated and unsaturated halides. In fact, it was also found that olefins of a secondary character, having three or more carbon atoms per molecule, such as propylene and beta-butylene, when brough into contact with a halogen at the specified elevated temperatures, not only react with the halogen to produce unsaturated halides, but also to retard or even partially inhibit the halogenation of the saturated aliphatic hydrocarbons originally present in the hydrocarbon mixture subjected to the halogenation reaction. Although there is no intention to be limited by any theory of the case, it is believed at the present time that the inhibiting effect of the secondary olefins above ethylene is due to the interaction of these olefins with the hydrocarbon free radicals which are formed as a consequence of the removal of a hydrogen atom from the hydrocarbon molecule during the reaction chain mechanism. The reaction of the olefins with these free radicals form relatively larger radicals which by reason of orientation requirements for successful collision react less rapidly with the halogen than do the relatively smaller radicals. However, whatever may be the actual cause thereof, the presence of olefins, and especially of secondary olefins, having three or more carbon atoms per molecule, does inhibit the chlorination of saturated aliphatic hydrocarbons, such as ethane, propane, etc., as this will be shown more fully in the examples presented hereinbelow.

The above discovery that hydrocarbon mixtures predominating in or consisting of ethylene and ethane and/or its higher homologues may be reacted with a halogen, such as chlorine, at relatively high temperatures, to produce a high yield of products of reaction between the saturated hydrocarbon and the halogen (to the substantial exclusion of products of ethylene halo-substitution and -addition) is of great economic importance. This is due to the fact that hydrocarbon mixtures consisting of ethane and ethylene, or mixtures thereof with methane are found in great abundance as by-products of petroleum refining. Since the ethane, when in admixture with methane, can be thermally chlorinated without the formation of any appreciable quantities of chloro-methanes (see Ellis, "The Chemistry of Petroleum Derivatives," Vol. I, page 712), the presence of the methane is not detrimental, and it is possible to employ efficiently such methane-ethane-ethylene gaseous mixtures as the starting material for the halogenation according to the present process. Furthemore, the gases resulting from petroleum cracking operations may also be used as the starting material for the production of saturated aliphatic halides. Such gases consist of various normally gaseous saturated and unsaturated hydrocarbons. It is known that the unsaturated hydrocarbons above ethylene may be easily removed from these gases, for example by a treatment with dilute sulfuric acid. On the other hand, the separation of the ethylene would necessitate the use of concentrated sulfuric acid which renders the process uneconomical and costly. In view of the present discovery, such gases from petroleum cracking operations may, therefore, be utilized for the production of valuable saturated aliphatic monohalides, such as ethyl chloride, n-propyl chloride, etc., by subjecting such gases to a preliminary treatment with dilute $H_2SO_4$ to separately remove the unsaturates above ethylene, and by subjecting the remaining mixture of saturated hydrocarbons and ethylene to the high temperature halogenation.

The invention may therefore be broadly stated to reside in a process of producing alkyl halides by subjecting mixtures of one or more saturated organic compound with ethylene to the action of a halogen, such as chlorine or bromine, at temperatures of above about 225° C., and preferably above about 275° C., the reaction products comprising the products of halogenation of the saturated compounds to the substantial exclusion of products of halo-substitution and -addition of ethylene. The invention also includes the process wherein mixtures of one or more saturated aliphatic hydrocarbons with ethylene are commingled with a halogen and subjected to the aforementioned temperatures to produce high yields of the saturated aliphatic halides to the substantial exclusion of products of halo-substitution and -addition of the ethylene. In one of its more specific embodiments, the invention covers a process of producing an ethyl halide, such as ethyl chloride, by subjecting a hydrocarbon mixture consisting of ethane and ethylene, or of methane, ethane and ethylene, to the action of a halogen, such as chlorine, at a temperature of above about 275° C. but below the temperature at which the reactants and/or the products of reaction are substantially decomposed. As stated, the ethane reacts with the halogen to produce ethyl halide, while the ethylene remains substantially unaffected.

The invention still further includes the process of subjecting gaseous hydrocarbon mixtures containing ethylene, but substantially or completely free of higher secondary olefins, to a process of halogenation at relatively high temperatures of above about 225° C. and preferably above about 275° C. thereby effecting the halo-substitution of the saturated aliphatic hydrocarbons, such as ethane, etc., to the substantial exclusion of halo-substitution and/or halo-addition of the ethylene.

As previously stated, the halo-substitution reaction between a saturated organic compound, such as a saturated aliphatic hydrocarbon, and a halogen yields the corresponding hydrogen halide as a by-product. In fact, when the products of halo-substitution are monohalides, the molal yield of such hydrogen halide is equal to that of the halo-substituted product. Since this hydrogen halide may be added to ethylene to produce ethyl halide, it is within the scope of the present invention to manufacture alkyl halides by reacting a mixture consisting of ethylene and one or more saturated organic compound, such as ethane, propane, etc., with a halogen at the elevated temperature at which such organic compound is halogenated to the substantial exclusion of halo-substitution or halo-addition of ethylene, and subsequently utilizing the hydrogen halide thus formed as the by-product of this first halogenation reaction for the production of ethyl halide by causing said hydrogen halide to react with the ethylene. If desired, the alkyl halides formed during the first reaction or step may be removed from the ethylene and hydrogen halide prior to effecting the reaction between the last-mentioned two substances. Such removal of the alkyl halides is particularly advantageous when the concentration of the ethylene in the reacting mixture is relatively low. The separation of the alkyl halides may be effected by any known method or means, such as scrubbing with a solvent having preferential solubility for the alkyl halides, by adsorption, as by use of activated charcoal, or by liquefying the alkyl halide, as by freezing. The separation of the alkyl halides prior to the interaction between the ethylene and the hydrogen halide may also be advantageous in cases where the primary material employed consisted of ethylene and one or more saturated aliphatic hydrocarbon having more than two carbon atoms per molecule. By thus separating the alkyl halides produced during the halo-substitution reaction, it is possible to separately obtain the higher alkyl halides, so that they will not be mixed with the ethyl halide obtained by the addition of the hydrogen halide to the ethylene.

The addition reaction between ethylene and the hydrogen halide is usually effected at temperatures which are somewhat lower than those desirable or necessary for the halo-substitution of the saturated aliphatic hydrocarbon such as ethane or propane. Thus, efficient yields of ethyl chloride may be obtained by effecting the reaction between ethylene and the hydrogen chloride at temperatures of between about 100° C. and 200° C. Although the reaction may be carried out without the use of a catalyst, it is preferable to employ substances which promote the addition of the hydrogen halide, such as hydrogen chloride or hydrogen bromide, to the ethylene. Without any intention of being limited, it may be stated that compounds of bismuth and related metals, such as antimony and other metals belonging to the fifth group of the Periodic System, are suitable catalysts for effecting this addition of the hydrogen halide to the ethylene. Bismuth chloride and bismuth bromide are particularly suitable for such use.

The following examples illustrate the applicability of the present invention to the efficient halogenation of hydrocarbon mixtures containing ethylene. Some of the examples also illustrate the inhibiting action of unsaturated secondary olefins on the halogenation of saturated aliphatic hydrocarbons. It is to be understood, however, that the examples are presented solely for purposes of illustrating the invention, and that there is no intention of being restricted to or limited by any specific reactants, yields and/or modes of operation illustrated.

*Example I*

A mixture of chlorine, ethane and ethylene was conveyed through a reaction zone at a rate of 75 c. c./min. of $Cl_2$, 112 c. c./min. of ethane and 112 c. c./min. of ethylene. The mixture reacted violently at about 235° C. and the reaction was allowed to proceed uncontrolled so that the reaction temperature was above 300° C. The reaction was entirely free from charring which is an indication that only the ethane reacted with the chlorine, because under these particular conditions the reaction between ethylene and chlorine always yields a tar, while ethane-chlorine mixtures do not. The gases effluent from the reactor were washed free from halogen and acid, formed as a by-product, while the liquid product was condensed, dried and distilled. This liquid reaction product was found to have the following composition:

|  | Mol per cent |
|---|---|
| Vinyl chloride | 6.3 |
| Ethyl chloride | 71.5 |
| 1,1-dichlorethane | 17.4 |
| 1,2-dichlorethane | 4.3 |
| Trichlorethane | 0.5 |

An analysis of the effluent gases clearly showed that, with the exception of the relatively small quantities of ethylene which reacted to form the vinyl chloride, only the ethane was chlorinated to the substantial exclusion of products of chlor-substitution and addition of the ethylene. It is to be noted that the 1,1-dichlorethane fraction can be derived from ethane only, and while the other dichloride (the yield of which is small) may be derived from ethylene, it, too, is to be expected to result from the chlorination of ethane. The analysis further showed that the ethyl chloride was formed solely by the chloro-substitution of ethane, and not by the addition of hydrogen chloride to ethylene.

*Example II*

A mixture consisting of equal parts by volume of ethane, ethylene and chlorine was diluted with an equal part by volume of carbon dioxide. The resulting diluted mixture was then conveyed at a rate of 300 c. c./min. through a reaction zone maintained at about 295° C. It was found that about 90% of the chlorine reacted, the chlorination being only via substitution. Furthermore, an analysis of the effluent gases and of the products of reaction showed that the chlor-substitution was substantially into the ethane and that there was very little, if any, chlor-substitution into the ethylene. Furthermore, the ethyl chloride formed was produced by chlor-substitution and not by the reaction of the HCl with ethylene.

The carbon dioxide was employed in the above example merely for the purpose of diluting the hydrocarbon-chlorine mixture, such dilution facilitating the control of the reaction since it prevents or decreases excessive decomposition, flashing of the mixture and tar and carbon formation. In this connection, it is to be noted that experiments have indicated that the use of a diluent slightly raises the lower temperature limit at which the ethane-ethylene mixture may be halogenated. Obviously other inert diluents such as nitrogen, helium, etc., may be used in lieu of or together with the carbon dioxide.

*Example III*

An ethane-chlorine gaseous mixture, in a ratio of 2:1, was diluted with an equal part of nitrogen and then conveyed through a reaction zone at a rate of about 300 c. c./min. At a reaction temperature of 274° C. about 96% of the chlorine reacted with the ethane, while about 75% of the chlorine entered into reaction when the temperature was lowered to about 260° C. To compare the above reaction rates with those obtainable when a higher olefin is added, the above diluted ethane-chlorine mixture was conveyed through the same reactor together with propylene introduced at the rate of 20 c. c./min. It was found that at the reaction temperature of 274° C. the amount of chlorine reacted was reduced from the above 96% to 83%, while at 260° C. only about 65% of the chlorine reacted with the hydrocarbon. It is to be noted that the above decreases take place despite an increase in the actual amount of hydrocarbon reactant. Furthermore, the inhibiting effect of olefins above ethylene is apparent since the decrease in the reacted chlorine occurred in spite of a simultaneous addition reaction (with the propylene) which addition reaction consumed about 8% of the chlorine.

*Example IV*

In order to show the inhibitory effect of beta-butylene on the high temperature vapor phase chlorination of ethane, the following two series of experiments were effected. For the first, the mixture chlorinated consisted of chlorine and ethane diluted with nitrogen, the rate being 50 c. c./min. of chlorine, 100 c. c./min. of ethane, and 150 c. c./min. of nitrogen. For the second series, the nitrogen was lowered to 130 c. c./min. while 20 c. c./min. of beta-butylene were added. The chlorination reactions were effected at temperatures of about 245° C., 260° C., and 274° C., and the following results were obtained:

| Reaction temperature | Chlorine reacted | |
|---|---|---|
|  | Mixture without beta-butylene | Mixture with beta-butylene |
|  | Per cent | Per cent |
| 245° C. | 22–24 | 20–21 |
| 260° C. | 71–74 | 51–52 |
| 274° C. | 88–94 | 78–80 |

From the above it is seen that the presence of even small percentages of butylene inhibits the chlor-substitution of ethane, and that this inhibitory effect is greater at the higher reaction temperatures.

Although the invention has been described with particular reference to the chlorination of mixtures of ethane with ethylene, and to the inhibitory effect of propylene and butylene on the high temperature vapor phase chlorination of ethane, it is to be understood that other saturated organic compounds, and particularly other saturated aliphatic hydrocarbons, when commingled with ethylene, may be halogenated according to the present invention. Also, it is to be understood that the presence of unsaturated secondary olefins, such as propylene, butylenes, etc., will inhibit the chlorination or bromination of such saturated aliphatic hydrocarbons.

It will be evident to those skilled in the art that the invention may be executed in a batch, intermittent or continuous manner. Generally, it is preferable to employ an amount of halogen not in excess of that theoretically required to react with all of the ethane or the like present in the hydrocarbon mixture to be halogenated. The presence of an excess of halogen is generally to be avoided, since the formation of undesirable higher halogenated products, such as di-halides and tri-halides, may be difficult to avoid. Therefore, when only mono-halides are desired, it is preferable to use an excess of the hydrocarbon, the preferred hydrocarbon-halogen ratio varying from 2:1 to about 7:1 or even higher.

We claim as our invention:

1. The process of manufacturing ethyl chloride from a hydrocarbon mixture predominating in ethane and ethylene, but substantially free of olefinic hydrocarbons having more than two carbon atoms per molecule, which comprises commingling said hydrocarbon mixture with chlorine, and subjecting the mixture thus obtained to an elevated temperature above 225° C., but below the temperature at which substantial degradation is favored, thereby effecting the chlorination of the ethane to the substantial exclusion of ethylene, and subsequently effecting a reaction between the ethylene and hydrogen chloride produced as a by-product of the ethane chlorination reaction, thereby obtaining additional quantities of ethyl chloride.

2. The process of manufacturing ethyl chloride from a hydrocarbon mixture predominating in ethane and ethylene, but substantially free of olefinic hydrocarbons having more than two carbon atoms per molecule, which comprises, commingling said hydrocarbon mixture with chlorine, and subjecting the mixture thus obtained to an elevated temperature above 225° C., but below the temperature at which substantial degradation is favored, thereby effecting the chlorination of the ethane to the substantial exclusion of ethylene.

3. The process of manufacturing an ethyl halide of the group consisting of ethyl chloride and ethyl bromide from a hydrocarbon mixture predominating in ethane and ethylene, but substantially free of unsaturated higher boiling homologues of ethylene, which comprises subjecting said hydrocarbon mixture to reaction with a halogen of the group consisting of chlorine and bromine at a temperature above about 275° C. but below the temperature at which substantial degradation is favored, thereby halogenating the ethane to the substantial exclusion of ethylene, and thus obtaining a hydrogen halide of the group consisting of hydrogen chloride and hydrogen bromide as a by-product, and subsequently reacting the ethylene with said hydrogen halide to obtain additional quantities of the ethyl halide.

4. The process of manufacturing an ethyl halide of the group consisting of ethyl chloride and ethyl bromide from a hydrocarbon mixture predominating in ethane and ethylene, but substantially free of olefinic hydrocarbons having more than two carbon atoms per molecule, which comprises subjecting said hydrocarbon mixture to reaction with a halogen of the group consisting of chlorine and bromine at a temperature above about 225° C. but below the temperature at which substantial degradation is favored, thereby halogenating the ethane to the substantial exclusion of ethylene.

5. The process of manufacturing alkyl chlorides from a hydrocarbon mixture predominating in normally gaseous saturated aliphatic hydrocarbons and ethylene, but substantially free of olefinic hydrocarbons having more than two carbon atoms per molecule, which comprises subjecting said hydrocarbon mixture to the action of chlorine at a temperature above about 225° C. but below the temperature at which substantial degradation occurs, thereby obtaining products of chlor-substitution of the saturated hydrocarbon to the substantial exclusion of products of chlor-addition and chlor-substitution of ethylene.

6. The process of manufacturing alkyl halides of the group consisting of ethyl chloride and ethyl bromide from a mixture of saturated aliphatic hydrocarbons gaseous under operating conditions and ethylene, which comprises subjecting said hydrocarbon mixture to reaction with a halogen of the group consisting of chlorine and bromine temperature above about 225° C., but below the temperature at which substantial degradation occurs, thereby obtaining products of halo-substitution of the saturated hydrocarbons to the substantial exclusion of products of halogenation of ethylene.

7. The process according to claim 6, wherein the ethylene is subsequently reacted with the hydrogen halide of the group consisting of hydrogen chloride and hydrogen bromide, formed as a by-product of the halo-substitution reaction, to produce the corresponding ethyl halide.

8. The process of manufacturing alkyl halides of the group consisting of alkyl chlorides and alkyl bromides from a mixture of saturated aliphatic hydrocarbons gaseous under operating conditions and ethylene, which comprises subjecting said hydrocarbon mixture to reaction with a halogen of the group consisting of chlorine and bromine at an elevated temperature favoring halo-substitution of the saturated hydrocarbons to the substantial exclusion of ethylene, thereby obtaining a mixture containing alkyl halides of the group consisting of alkyl chlorides and alkyl bromides, a halogen halide of the group consisting of hydrogen chloride and hydrogen bromide and ethylene, and effecting a reaction between the ethylene and the hydrogen halide to produce the corresponding ethyl halide.

9. The process according to claim 8, wherein the alkyl halides obtained by the high temperature halo-substitution reaction are separated from the reaction mixture prior to the interaction between the ethylene and the hydrogen halide.

10. In a process of manufacturing alkyl halides of the group consisting of the alkyl chlorides and alkyl bromides from a mixture of saturated aliphatic hydrocarbons gaseous under operating conditions and ethylene, the steps of subjecting said mixture to reaction with a halogen of the group consisting of chlorine and bromine at an elevated temperature favoring halo-substitution of the saturated aliphatic hydrocarbons, but below the temperature at which substantial degradation takes place, and recovering the saturated alkyl halides.

11. The process of halogenating normally gaseous saturated aliphatic hydrocarbons, which comprises subjecting said aliphatic hydrocarbons and ethylene, in the substantial absence of olefinic hydrocarbons having more than two carbon atoms, to reaction with a halogen of the group consisting of chlorine and bromine at an elevated temperature at which halo-substitution of the saturated hydrocarbons takes place, but below the temperature at which substantial degradation is favored.

12. The process of halogenating saturated aliphatic hydrocarbons, which comprises subjecting a mixture of saturated aliphatic hydrocarbons which are gaseous under operating conditions and of ethylene to reaction with a halogen of the group consisting of chlorine and bromine at an elevated temperature at which halo-substitution of the saturated aliphatic hydrocarbons takes place to the substantial exclusion of halogenation of the ethylene, but below the temperature at which substantial degradation occurs.

13. The process of manufacturing an ethyl halide of the group consisting of ethyl chloride and ethyl bromide which comprises commingling ethane and ethylene with a halogen of the group consisting of chlorine and bromine, subjecting the mixture thus obtained, in the substantial absence of olefinic hydrocarbons having more than 2 carbon atoms per molecule, to an elevated temperature above 225° C. but below the temperature at which substantial degradation is favored, thereby effecting the halogenation of the ethane to the substantial exclusion of ethylene, and subsequently effecting a reaction between the ethylene and hydrogen halide produced as a by-product of the ethane halogenation reaction, thereby obtaining additional quantities of the ethyl halide.

14. The process of manufacturing an ethyl halide of the group consisting of ethyl chloride and ethyl bromide which comprises commingling ethane and ethylene with a halogen of the group consisting of chlorine and bromine, and subjecting the mixture thus obtained, in the substantial absence of olefinic hydrocarbons having more than 2 carbon atoms per molecule, to an elevated temperature above 225° C., but below the temperature at which substantial degradation is favored, thereby effecting halogenation of the ethane to the substantial exclusion of ethylene halogenation.

15. The process of manufacturing ethyl chloride which comprises commingling a normally gaseous saturated hydrocarbon fraction predominating in ethane, in the presence of ethylene, but in the substantial absence of olefinic hydrocarbons having more than two carbon atoms per molecule, with chlorine, and subjecting said mixture to an elevated temperature above 225° C. but below the temperature at which substantial degradation is favored, thereby chlorinating the ethane to the substantial exclusion of ethylene chlorination.

WILLIAM E. VAUGHAN.
FREDERICK F. RUST.